United States Patent [19]
Quinn

[11] 3,769,888
[45] Nov. 6, 1973

[54] COMPUTER FLASH LIGHT SENSING APPARATUS

[75] Inventor: Peter T. Quinn, Littleton, Colo.

[73] Assignee: Honeywell Inc., Minneapolis, Minn.

[22] Filed: Dec. 6, 1971

[21] Appl. No.: 204,867

[52] U.S. Cl. .............. 95/10 CE, 235/64.7, 315/156
[51] Int. Cl. ............................................ G01j 1/46
[58] Field of Search ............. 95/10 R, 10 B, 10 PO, 95/10 C, 64 A, 10 CE; 235/64.7; 315/156

[56] References Cited
UNITED STATES PATENTS

| | | | |
|---|---|---|---|
| 3,541,387 | 11/1970 | Ackermann | 315/156 X |
| 3,072,029 | 1/1963 | Leitz | 95/10 C |
| 3,481,258 | 12/1969 | Mori et al. | 95/10 C |
| 2,147,999 | 2/1939 | Tonnies | 235/64.7 X |
| 2,924,144 | 2/1960 | Bakke et al. | 235/64.7 |
| 3,658,431 | 4/1972 | Richards | 235/64.7 X |

*Primary Examiner*—Fred L. Braun
*Attorney*—Arthur H. Swanson et al.

[57] ABSTRACT

A light sensing apparatus of a computer-type photoflash system is independently moveable with respect to an associated camera and flash unit. It includes a light responsive device, operable to sense light received from a scene being photographed and provide an electrical effect upon sensing a predetermined amount of that light, and a calculator means device, operable to set in selected values of various independent photographic variables and to display values of photographic variables dependent upon the selected values of the independent variables. The effective sensitivity of the light responsive device is adjusted in variable accordance with the selected values of the independent photographic variables.

9 Claims, 5 Drawing Figures

INVENTOR.
PETER T. QUINN

BY Lockwood D Burton

ATTORNEY

INVENTOR.
PETER T. QUINN
BY
Lockwood D. Burton
ATTORNEY

COMPUTER FLASH LIGHT SENSING APPARATUS

Subject matter disclosed but not claimed herein is disclosed and claimed in a copending application of Francis T. Ogawa, Ser. No. 108,876, filed on Jan. 22, 1971, now U.S. Pat. No. 3,714,443, copending application of Dean M. Peterson and Ludwig J. Keck, Ser. No. 204-868, filed on even date herewith, now U.S. Pat. No. 3,730,064, copending application of Francis T. Ogawa, Serial No. 285474, which is a divisional application from the above referenced application Serial No. 108876, copending application Francis T. Ogawa, Serial No. 108,878 filed on January 22, 1971, now Patent No. 3,737,721, and copending application of Roger D. Erickson, Ser. No. 108,877 filed on Jan. 22, 1971, now abandoned.

The present invention relates generally to computer-type photoflash systems and more particularly to a unique light sensing apparatus for use with such systems.

Computer-type photoflash systems are generally well known in the art. Basically, a light producing means is selectively actuated to furnish light for the illumination of a scene to be photographed. A light sensing means senses light received from that scene and, upon receipt of a predetermined quantity of light, generates a quench signal which is effective to terminate the light being produced. An example of such a computer flash system is disclosed in the above referenced copending application by Francis T. Ogawa.

In computer type photoflash systems there are a number of variables which should be correlated before an optimum reproduction of a scene being photographed can be developed. For example, the illumination or power level of a given light producing means must be related to the $f$-stop and distance settings of a given camera means for a computer flash system to function effectively. Similarly, the speed of the particular film used in the camera, must be related to the $f$-stop and distance settings of the camera in order to insure the effective operation of the computer-flash system. In the past, those variables were taken into consideration, to a degree, in that, for use with a film having a particular film speed, a predetermined f-stop was required to be set into the camera. That, in turn, provided a relatively limited range of camera-to-subject distance over which the computer-type flash would be effective. There remains a need, therfore, for an apparatus, which may be used in a computer-type photoflash system, which effectively coordinates, with greater versatility, a plurality of photographic variables in order to permit an optimum photographic reproduction of a selected scene.

In the past, a photographer using computer type flash apparatus has been restricted in his choice of $f$-stop/distance settings with any given photographic film. For example, for a given photographic film, a photographer had to use a particular predetermined $f$-stop. In many cases, a photographer may require a smaller or larger field of focus than the predetermined $f$-stop would permit with the given film speed. Therefore, there is a need for an apparatus which may be used in a computer-type photoflash system and which allows a photographer to choose from a greater range of $f$-stop/distance settings for any given photographic film to be used in the camera.

It is also desirable for a photographer to be able to select a portion of the scene being photographed to act as a light level reference for a light sensing means in a computer flash system. For example, when a photographer takes a picture of a subject in a very light or very dark background, the light sensing means of a computer-type system will sense the total light reflected from the entire scene as a measure of the illumination of that scene; consequently, the subject in the developed photograph would show up either under-exposed or over-exposed, respectively, depending on the relative brightness of the background with respect to the subject. Therefore, there is a need for a light sensing means which may be used in a computer-type photoflash system which allows a photographer to select from a greater range of $f$-stop and distance settings for any given film used in an associated camera, and also to select a particular portion of that scene to act as an illumination reference for an associated light sensing means.

It is accordingly an object of the present invention to provide a light sensing apparatus which fulfills the foregoing needs.

It is another object of the present invention to provide a light sensing apparatus which may be used with a computer-type photoflash system, and which effectively coordinates a plurality of photographic variables whereby to permit an optimum photographic reproduction of a selected scene.

It is a further object of the present invention to provide a light sensing apparatus as set forth, and which further allows a photographer to choose from a greater selection of f-stop and distance combination settings, of an associated camera, for a given film used in an associated camera, without diminishing the quality of the photographic reproduction.

It is yet another object of the present invention to provide a light sensing apparatus as set forth, which further allows a photographer to select a portion of a scene being photographed for an illumination reference in generating a light terminating or quench signal in the computer-type photoflash circuit.

It is a still further object of the present invention to provide a light sensing apparatus as set forth, which is simple in design and compact in size.

In accomplishing these and other objects, there has been provided, in accordance with the present invention, a light sensing apparatus which is independently moveable with respect to associated camera and light producing means of a computer-type photoflash system. A light sensing apparatus may be directed toward a selected portion of the scene being photographed whereby that selected portion serves as an illumination reference for the automatic quenching of the light producing means. The light sensing apparatus includes a calculator means for setting in a value representative of the film speed of the particular film used in the camera, and correlating the possible range and $f$-stop settings of the camera means in accordance with that set-in value of film speed. The calculator also includes means for displaying one of a plurality of camera-to-scene ranges, in accordance with the particular power level of the light producing means being used. Means are also included to adjust the effective sensitivity of the light sensing apparatus in accordance with a selected $f$-stop and range combination setting, whereby a greater selection of $f$-stop and range combination settings is available to a photographer for any given film speed.

A better understanding of the present invention may be had from the following description, when read in connection with the accompanying drawings, in which.

Figure 1:
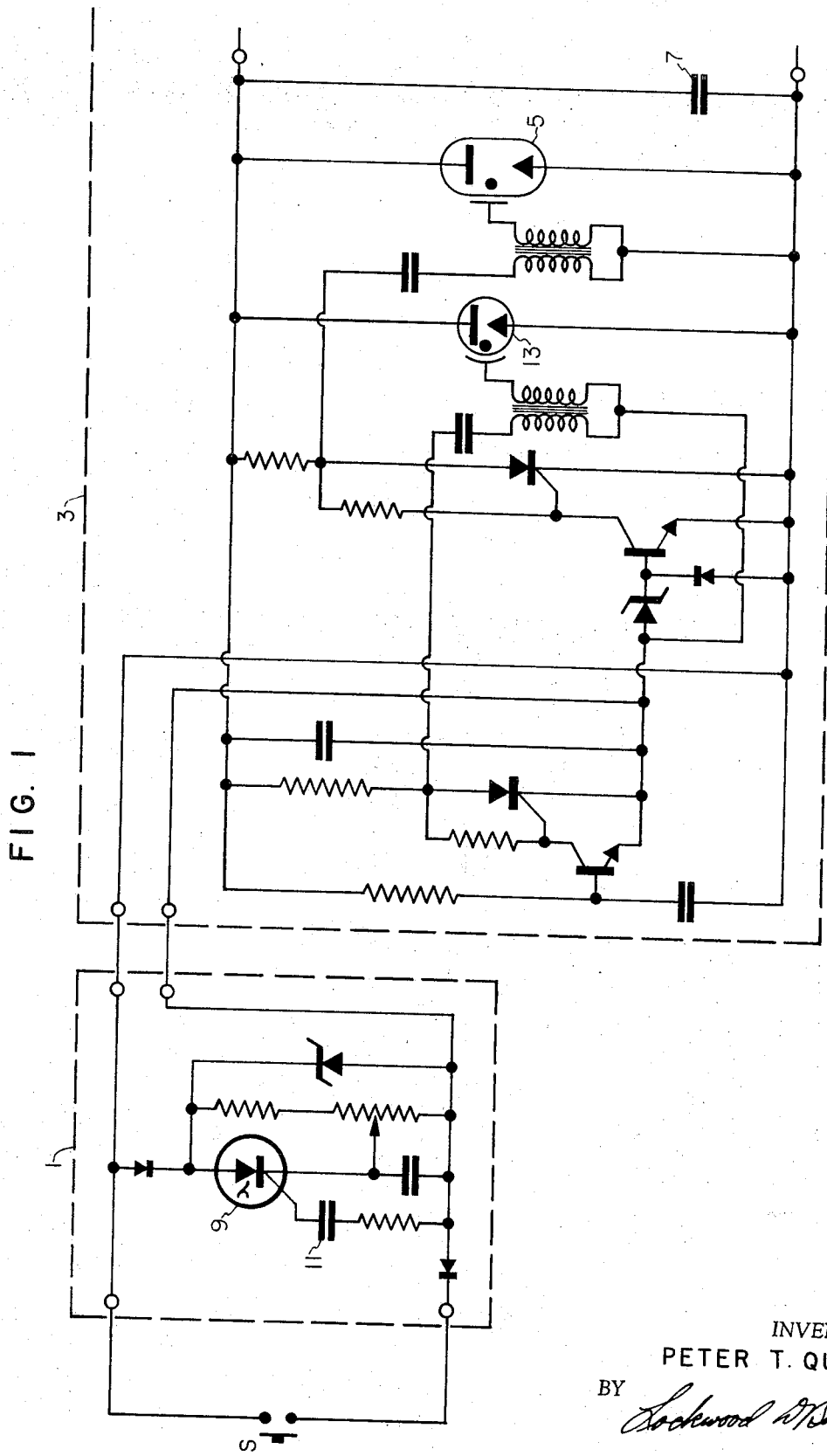
FIG. 1 is a schematic diagram of a circuit which may be used with the present invention.

Referring in more detail to FIG. 1, an examplary computer-type photoflash circuit includes a shutter switch S of an associated camera means which is selectively actuable for producing an electrical effect, here an effective contact closure, which when transmitted through a light sensing circuit 1 and applied to a flash circuit 3 is operable to initiate conduction in a flash tube 5. A main storage capacitor 7 is maintained in a charged state. When the flash tube 5 is triggered by the transmitted contact closure, the charge on the capacitor 7 is dumped therethrough whereby to furnish light to illuminate a scene being photographed. When the flash tube 5 becomes conductive, an "enable" signal is transmitted from the flash circuit 3 to the light sensing circuit 1, and a light responsive means 9, therein, is enabled to monitor the scene being photographed and provide a control signal in variable accordance with the light received thereby. In the present example, the light responsive means 9 is a light activated silicon controlled rectifier (LASCR), and the control signal is the voltage of the gate terminal of the LASCR. As light is received from a scene being photographed, a current representative thereof flows from the gate terminal of the LASCR 9 and is stored by a capacitor 11. When the charge stored on the capacitor 11 exceeds a predetermined value, the gate-cathode junction of the LASCR 9 becomes forward biased and the LASCR 9 becomes conductive. The conduction through the LASCR 9 produces another electrical effect, here a potential difference decrease, which is transmitted to the flash circuit 3 and operates to trigger conduction through a quench tube 13 connected in parallel with the flash tube 5. Since the quench tube 13 has a much lower conducting resistance than the flash tube 5, conduction through the quench tube 13 effectively short circuits the flash tube 5 thereby rapidly discharging the capacitor 7 and quenching the conduction through, and therefore the light given off by, the flash tube 5. When the voltage across the flash tube 5 and the quench tube 13 has decreased to a predetermined value, both tubes will cease conducting, thereby allowing the capacitor 7 to be recharged to its ready state to await initiation of another cycle by the shutter switch S. The computer-type photoflash circuit of FIG. 1 is completely described, and the novel features thereof claimed, in the above referenced copending application of Francis T. Ogawa. Only a brief description of the circuit has herein been set forth since the details of operation of that circuit are not essential to the understanding of the present invention.

Figure 2:
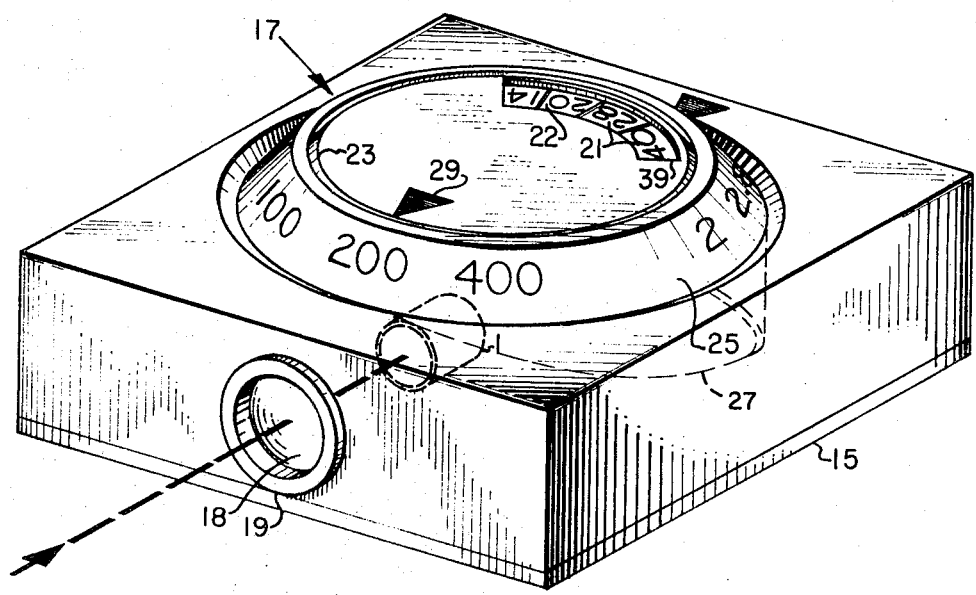
FIG. 2 is a perspective view of a light sensing apparatus according to the present invention.

In FIG. 2, a light sensing apparatus 15 is shown to include a calculator means 17 and a light sensing means 1. The light sensing means 1 is arranged to receive light from a scene being photographed through a lens means 18 and an apperture 19. A first set of indicia 21, imprinted on a sliding disk 22 and representative of various maximum camera-to-subject distances, appears through a window or opening 39 of a first selection means 23. The sliding disk 22 is adjustable relative to the selection means 23 to set in maximum range settings for the photographic system being used, as determined by the power available from the associated flash unit 3 and the film speed. FIG. 2 shows the first selection means 23 encircled by a second selection means 25. A light attentuator 27 is shown in phantom within the light sensing apparatus 15. The interrelationships and operation of the various members of the light sensing apparatus 15 will be more fully appreciated by reference to FIGS. 3, 4, and 5.

Figure 3:
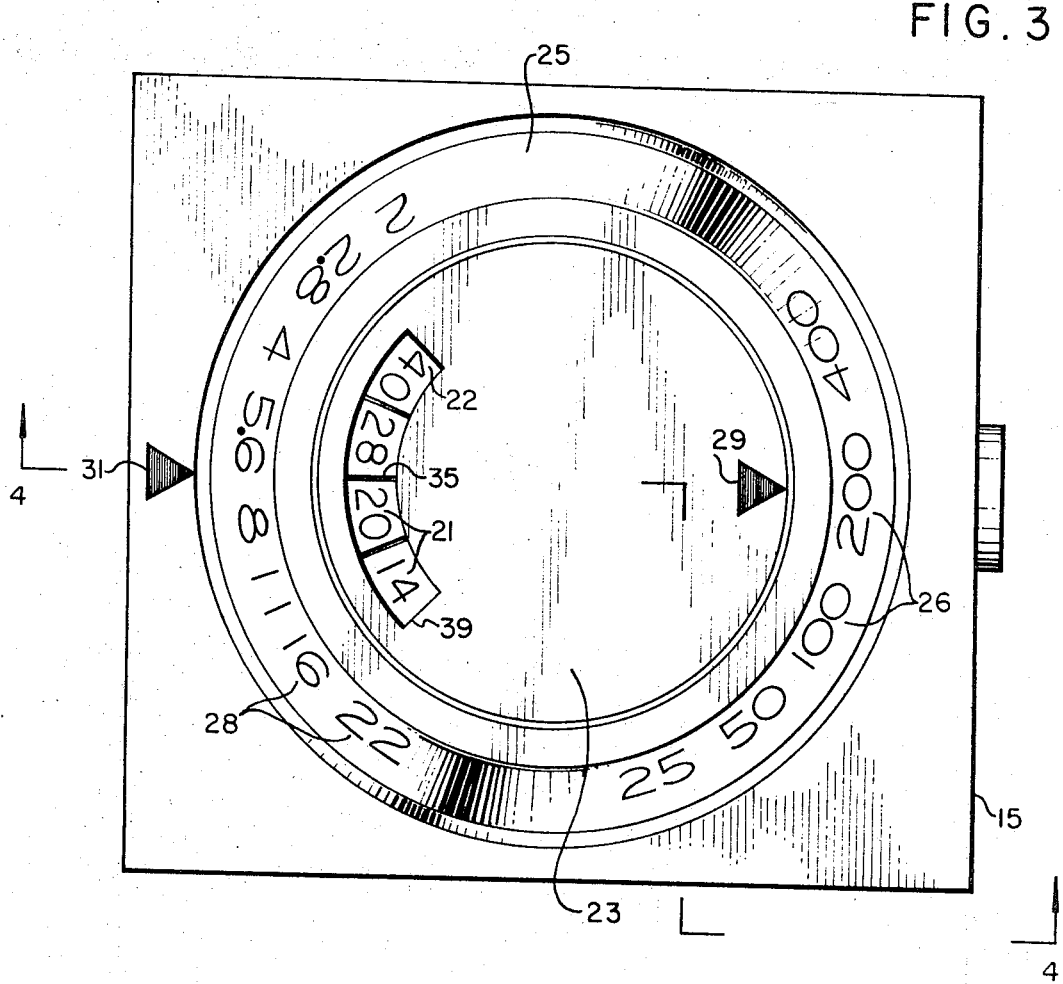
FIG. 3 is a top view of the light sensing apparatus shown in FIG. 2.

FIG. 3 shows the first selection means 23 to include the first set of indicia 21, and a first indicator means 29. The second selection means 25 includes a second set of indicia 26 representative of various ASA film speeds, and a third set of indicia 28 representative of various f-stop settings of an associated camera means. A second indicator means 31 is mounted on the base of the light sensing apparatus 15.

Figure 4:
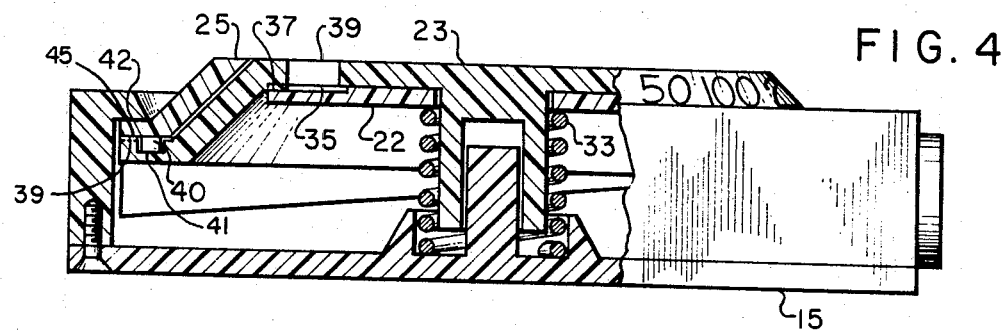
FIG. 4 is a partial cross-sectional view of the light sensing apparatus shown in FIG. 2.

In FIG. 4, a partial cross-sectional view of the light sensing apparatus is shown. The sliding disk 22 is biased flush against the first selection means 23 by a biasing means or spring 33 which is seated within the light sensing apparatus 15. The sliding disk 22 includes radial grooves 35 (FIG. 3) which are notched into the surface thereof between the several subject-to-camera distance indicia imprinted thereon. The grooves 35 of the disk 22 engage with tongues 37 on the first selection means 23. The disk 22 may be depressed to disengage the tongues 37 from the grooves 35 whereby the disk 22 may be rotated to display another range of discrete subject-to-camera maximum distances. The set of maximum distances displayed by the disk 22 will be determined by the light output capability of the particular flash unit being used. For example, the flash unit used in the present example will provide a maximum range of 40 feet. If a more powerful flash unit were to be used, the first selection means 23 or sliding disk 22 would be so rotated that the value 14 will be hidden beneath the first selection means 23 and a new indicium, for example 56 will be uncovered thereby. The four displayed maxima would then be 20, 28, 40, and 56. As hereinbefore mentioned, the highest of the disk 22 is determined by the particular flash unit being used, and therefore it need not be adjusted for every photograph if the flash unit used in the system remains the same. Any relatively pointed object, such as a ball point pen or a pencil, may be used to depress the disk 22, thereby disengaging the tongues 37 from the grooves 35. The disk 22 may then be rotated to display the proper maximum subject-to-camera distance. When the proper maximum subject-to-camera distance, as determined by the flash unit, appears as the highest number visible through the window 39 of the first selection means 23, the pressure exerted by the pointed object engaging a groove 35 may be released whereupon the grooves 35 will again engage with the tongues 37 thereby locking the disk 22 in place with respect to the first selection means 23. The tongues 37 and grooves 35 may be replaced with any suitable engagement means known in the art, including a simple friction type engagement. However, the detenting relationship is believed to be preferrable.

A similar engagement means is used to couple the first selection means 23 with the second selection means 25. In the present example a plurality of locking teeth 45 are positioned on the lower portion of the second selection means 25 and spaced along the periphery thereof. The biasing means 33 urges the locking teeth 45 to engage with correspondingly spaced groove-type recesses in the first selection means 23 thereby precluding any inadvertent independent movement of the second selection means 25 with respect to the first selection means 23. Therefore, when the locking teeth of the second selection means 25 are biased into engagement with the first selection means 23, both the second selection means 25 and the first selection means 23 will move together as one unit. The locking teeth 45 may be disengaged from the first selection means 23 by depressing the first selection means 23 thereby overcoming the spring bias applied thereto by the biasing means or spring 33. When the first selection means 23 is depressed, either the second selection means 25 or the first selection means 23 may be rotated independently of the other. A spring 40 rides within a recess 41 of the first selection means 23 and maintains the second selection means 25 flush against a lip 42 of the light sensing apparatus 15 when the first selection means 23 is depressed. Upon releasing the pressure applied to the first selection means 23, the locking teeth 45 of the second selection means 25 will again engage with corresponding recesses in first selection means 23 thereby locking the second selection means 25 to the first selection means 23.

Figure 5:
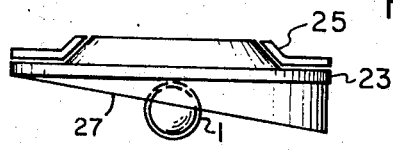
FIG. 5 is a partial sectional view showing one feature of the light sensing apparatus shown in FIG. 2.

FIG. 5 shows the light attentuator 27 coupled to the first selection means 23. As the first selection means 23 is rotated, the light attentuator 27 attentuates the light received by the light sensing means 1 in variable accordance therewith. In the present example, the light attentuator 27 is illustrated by a simple rotating ramp although many other means, such as variable density filters, may be used to serve the function of varying the effective sensitivity of the light sensing means in accordance with changes in the first selection means 23. It should be noted that means may be incorporated into the light sensing apparatus, for example an adjustable lens system within the apperture 19, to selectively adjust the viewing angle of the light sensing apparatus with respect to the viewing angle of an associated camera. Such modification is more fully explained in the hereinbefore referenced copending application of Roger D. Erickson. When the angle of view of the light sensing apparatus is less than that of an associated camera, and the light sensing apparatus is independently moveable with respect to the camera, a photographer may aim the light sensing apparatus toward any portion of the scene being photographed. The photographer may thereby select any portion of the entire scene being photographed to act as an illumination criterian in determining when a quench signal will be generated. That feature overcomes the exposure problems associated with taking a photograph of a subject against a very bright or very dark background since the photographer may so adjust the viewing angle of the light sensing apparatus, and so aim the light sensing apparatus that it only "sees" the subject being photographed and not the background.

In a typical operational sequence, a photographer having the light sensing apparatus of the present invention and an associated camera available, would select one of a plurality of flash units available for use with the present system. The selected flash unit would indicate to the photographer the proper set of maximum subject-to-camera distances associated with that flash unit. The photographer would then so set the disk 22 that those particular settings are displayed through the window 39 as hereinbefore explained. The photographer would then depress the first selection means 23 and rotate the second selection means 25 until the particular indicium of the second set of indicia 26 on the second selection means 25, representative of the particular ASA film speed of the film he is using, lines up with the indicator means 29 on the first selection means 23. The photographer would then release the pressure exerted on the first selection means 23, thereby allowing the second selection means 25 and the first selection means 23 to again become engaged. The ASA film speed adjustment would position the range of available f-stops, imprinted on the second selection means 25, opposite the ASA indicia, with respect to the set of available maximum subject-to-camera distances displayed through the window 39. After releasing the pressure from the first selection means 23, the second selection means 25 and the first selection means 23 will again engage and thereafter rotate as a unit. The photographer would then rotate both the second selection means 25 and the first selection means 23, as a unit, until either a desired f-stop, as represented on the second selection means 25, or a desired maximum range, as represented on the first selection means 23, aligns with the indicator means 31 of the light sensing apparatus 15. As the first selection means 23 is rotated, the light attentuator 27 is also rotated, thereby changing the effective sensitivity of the light sensing means 1. That changing of the effective sensitivity of the light sensing means 1 permits a greater selection of combination of f-stop/range settings to be available from which a photographer may choose, since the light sensing means is automatically compensated in accordance with the chosen maximum range. After the photographer has so set the calculator 17 that his chosen f-stop or camera-to-subject maximum range is aligned with the indicator means 31 on the light sensing apparatus 15, he would set the indicated f-stop on his camera and then proceed to initiate the automatic computer-type flash operation by depressing the shutter switch of the camera.

Thus there has been provided, a unique light sensing apparatus, including a calculator means and a light sensing means, for effectively correlating several variables of a photographic system, and affecting a light responsive means therein, whereby to allow a photographer a greater selection of f-stop-distance settings with which the computer-type photoflash system will properly function. The unique light sensing apparatus also allows a photographer to choose a portion of a scene being photographed to act as a light reference of scene illumination for the timely generation of a quench signal.

I claim:

1. A light sensing apparatus, for use with a photographic system employing a camera means and an electronic flash unit, said light sensing apparatus comprising:

a first pair of terminals arranged for connection to camera shutter contacts of the camera means, which contacts, when closed, complete a path between said first pair of terminals;

a second pair of terminals arranged for connection to said electronic flash unit, said first and second pairs of terminals comprising the sole means for connection from the light sensing apparatus to the camera means and the flash unit, respectively;

means connected between said first and second pairs of terminals for applying a first signal to said second pair of terminals, for transmission thereby to the flash unit for causing the latter to produce light for illuminating an object to be photographed by the camera means upon the completion of a path between said first pair of terminals;

a normally disabled light responsive integrating means arranged to receive light from the object, said integrating means being connected to said second pair of terminals to receive an enabling signal therefrom which is produced by the firing of the flash unit, said integrating means, when enabled and having received a predetermined quantity of light, providing at said second pair of terminals a second signal for terminating the production of light by the flash unit;

calculator means including selection means selectively operable for setting in a value of an independent variable of said photographic system and indicating a value of at least one of a plurality of photographic variables dependent upon said independent variable; and means responsive to said selection means for varying the effective sensitivity of said light sensing means in accordance with said value of said independent variable, said light sensing apparatus being independently movable with respect to said camera means and said electronic flash unit.

2. The invention as set forth in claim 1 wherein said independent variable is an indication of film speed of a light sensitive film used in said camera and said at least one photographic dependent variable is an indication of subject to camera distance.

3. The invention as set forth in claim 1 wherein said independent variable is an indication of film speed of a light sensitive film used in said camera and one of said plurality of said photographic dependent variables is an f-stop setting of said camera means.

4. The invention as set forth in claim 3 wherein said photographic dependent variables indicated by said calculator means further include subject-to-camera distance.

5. A light sensing apparatus for use with a photographic system employing a camera means and an electronic flash unit, said light sensing apparatus comprising:

a first pair of terminals arranged for connection to the shutter contacts of the camera means, which contacts, when closed, complete a path between said first pair of terminals;

a second pair of terminals arranged for connection to the flash unit, said first and second pairs of terminals comprising the sole means for connection from the light sensing apparatus to the camera means and the flash unit, respectively;

means connected between said first and second pairs of terminals for applying a first signal to said second pair of terminals, for transmission thereby to the flash unit for causing the latter to produce light for illuminating an object to be photographed by the camera means upon the completion of a path between said first pair of terminals;

a normally disabled light responsive integrating means arranged to receive light from the object, said integrating means being connected to said second pair of terminals to receive an enabling signal therefrom which is produced by the firing of the flash unit, said integrating means, when enabled and having received a predetermined quantity of light, providing at said second pair of terminals a second signal for terminating the production of light by the flash unit;

light attenuator means positioned to attenuate said light received by said light responsive means;

first selection means having a first set of indicia and a first indicator means thereon, said light attenuator means being coupled to said first selection means;

second selection means having second and third sets of indicia thereon;

second indicator means; and biasing means for biasing said first and second selection means into mutual engagement whereby to selectively move in unison with respect to said second indicator means, said first selection means being selectively operable, upon an application of a disengaging force to overcome said biasing whereupon said second selection means is selectively movable, with respect to first selection means, to relate a selected one of said second set of indicia to said first indicator means whereby to position said first set of indicia with respect to said third set of indicia in accordance therewith, said first and second selection means, upon a subsequent removal of said disengaging force, being selectively movable in unison to relate one of a plurality of combinations of individual indicium of said first and third sets, to said second indicator means, and, concurrently, to adjust said light attenuator means in variable accordance therewith.

6. The invention as set forth in claim 5 wherein said first and second selection means are annular.

7. The invention as set forth in claim 6 wherein said second selection means is a truncated conical annulus, concentric with respect to said first selection means.

8. The invention as set forth in claim 5 wherein said first set of indicium is selectively changeable to correspond to a changeable external condition affecting said first set of indicium.

9. The invention as set forth in claim 5 wherein said first set of indicia represents various values of camera-to-subject distances, said second set of indicia representing various values of film speed, and said third set of indicia representing various values of f-stops of an associated camera means.

* * * * *